United States Patent [19]

Shakespear

[11] Patent Number: 4,671,563
[45] Date of Patent: Jun. 9, 1987

[54] SMALL LIGHTWEIGHT AUTOMOTIVE VEHICLE HAVING SWINGABLE REAR SEATING MODULE MEANS

[75] Inventor: Horacio Shakespear, Orchard Lake, Mich.

[73] Assignee: General Motors Corporation, Detroit, Mich.

[21] Appl. No.: 892,323

[22] Filed: Aug. 4, 1986

[51] Int. Cl.[4] .......................... B62D 31/00; B60N 1/04; B60J 5/04
[52] U.S. Cl. ...................................... 296/185; 296/66; 296/67; 296/68; 296/146; 296/202; 49/36; D12/90
[58] Field of Search ................. 296/65 R, 185, 66–68, 296/146, 195, 196, 197, 202; 49/36, 40, 41; D12/85, 90

[56] References Cited

U.S. PATENT DOCUMENTS

| D. 168,440 | 12/1952 | Flatt | 296/68 X |
| D. 273,577 | 4/1984 | Fleishman | D12/85 |
| 1,768,466 | 6/1930 | Hitt et al. | 296/66 |
| 2,822,214 | 2/1958 | Rivolta | 296/146 |
| 3,542,417 | 11/1970 | Mohs | 296/146 |

FOREIGN PATENT DOCUMENTS 1241658  8/1960  France .

Primary Examiner—Randolph A. Reese
Assistant Examiner—Dennis H. Pedder
Attorney, Agent, or Firm—William A. Schuetz

[57] ABSTRACT

The disclosure relates to a small lightweight automotive vehicle having a frame supported on front and rear axles, a stationary front module containing an engine, drive train, controls, etc. and a rear seating module which is pivotally supported by the frame for movement about a generally vertically axis extending above the rear axles to permit easy entry into and exit from the vehicle. The vehicle could either have a single or a pair of pivotal rear seating modules and the basic geometric structural shell for the vehicle is a tetrahedron so that the seating module or modules when pivoted to an open position to permit entry to and exit from the vehicle requires relatively little side clearance.

5 Claims, 9 Drawing Figures

SMALL LIGHTWEIGHT AUTOMOTIVE VEHICLE HAVING SWINGABLE REAR SEATING MODULE MEANS

The present invention relates to an automotive vehicle and more particularly, to a small, lightweight automotive vehicle having a frame means supported on front and rear axles, a front compartment or module containing an engine, drive train controls, etc., and a rear seating module means which is pivotally supported by the frame means for movement about a generally vertical axis extending above the rear axle to provide easy entry into and exit from the vehicle.

Heretofore, small, lightweight automotive vehicles have been provided. In such vehicles entry into and exit from the vehicle seat or seats usually is affected by a movable top or canopy or a front or rear door means which is pivotally connected to the vehicle for movement about a generally horizontal or skewed axis which raises the door or canopy above the roof line of the vehicle. Racing cars and the vehicle shown in U.S. Pat. Nos. 2,822,214 and 3,542,417 respectively illustrate examples of such vehicle arrangements. It is also known to pivotally connect a rumble seat of a vehicle to a vehicle side structure for movement about a generally vertical pivot axis to permit entry and exit from the rumble seat. Such an arrangement is shown in U.S. Pat. No. 1,768,466. While such arrangements have been satisfactory for the purposes intended, they nevertheless either require upward movement of a door or canopy means above the roof line of the vehicle or they still do not permit easy entry and exit to and from the vehicle without a lot of clearance from the vehicle.

Accordingly, a broad object of the present invention is to provide a new and improved small, lightweight automotive vehicle which is of a relatively simple construction, small, lightweight and which requires relatively little side clearance while permitting easy entry and exit for a driver or occupant to and from the vehicle.

A further object of the present invention is to provide a new and improved small lightweight automotive vehicle having a frame means supported on front and rear axles, a front compartment or module containing an engine, drive train, controls, etc., and a rear seating module which is pivotally supported by the frame means for movement about a generally vertical axis extending above the rear axles to permit easy entry into and exit from the vehicle.

Another object of the present invention is to provide a new and improved small, lightweight automotive vehicle, as defined in the next preceding object, and in which the basic, geometric structural shell for the vehicle is a tetrahedron.

Yet another object of the present invention is to provide a new and improved small, lightweight automotive vehicle which comprises a unitary frame means, a pair of front and rear wheel assemblies for supporting the frame means, a front module stationarily mounted to the frame means, a rear seating module containing a vehicle seat or seat means and side closures and which is pivotally supported by the frame means and the front module adjacent its rear end for movement about a generally vertical axis which intersects the longitudinal axis of the frame means of the vehicle to permit the rear module to be moved between an open position to permit entry and exit to the vehicle and a closed position in which the rear module is lockable to the front module so that the vehicle can be operated, and an inflatable seal means to permit the rear module to be sealed and unsealed from the front module.

A still further object of the present invention is to provide a new and improved small, lightweight automotive vehicle, as defined in the next preceding object, and wherein the front module of the vehicle contains an engine, a drive train, windshield, dashboard, steering means and controls for the vehicle, and wherein the rear body seating module includes a floor, which together with the seat means and side closure means defines a front opening to permit entry and exit of the vehicle, windows carried by the side closures and rear wheels and body structure whereby the entire rear module is rotatable about its pivot axis between the closed position in which it is longitudinally aligned with the longitudinal axis of the vehicle and an open position in which the rear body module has its longitudinal axis skewed with respect to the longitudinal axis of the vehicle to expose the front to permit entry into and exit from the vehicle.

Yet another object of the present invention is to provide a new and improved small, lightweight automotive vehicle, as defined in the penultimate object, an in which the front module of the vehicle contains an engine, a drive train, windshield, dashboard, steering means and controls for the vehicle, and wherein the rear body seating module comprises a pair of seating modules which are pivotally supported on an upwardly extending portion of the frame means which forms an acute included angle with the horizontal portion of the frame means for movement about an axis which intersects the longitudinal axis of the vehicle and in which the rear seat modules are each rotatable about the pivot axis between a closed position in which they are longitudinally aligned with the front module of the vehicle and an open position in which they are disposed laterally of the vehicle so as to permit easy entry into and exit from the vehicle by both a driver and a passenger.

Yet another object of the present invention is to provide a new and improved small, lightweight automotive vehicle, as defined in any of the preceding objects, and which includes a suitable locking means to lock the rear body module to the remainder of the vehicle when in its closed position and to unlock the same to enable the rear body module to be moved to its open position and an inflatable seal means to seal the rear seating module to the front module when the former is in its closed position.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which.

Figure 7:
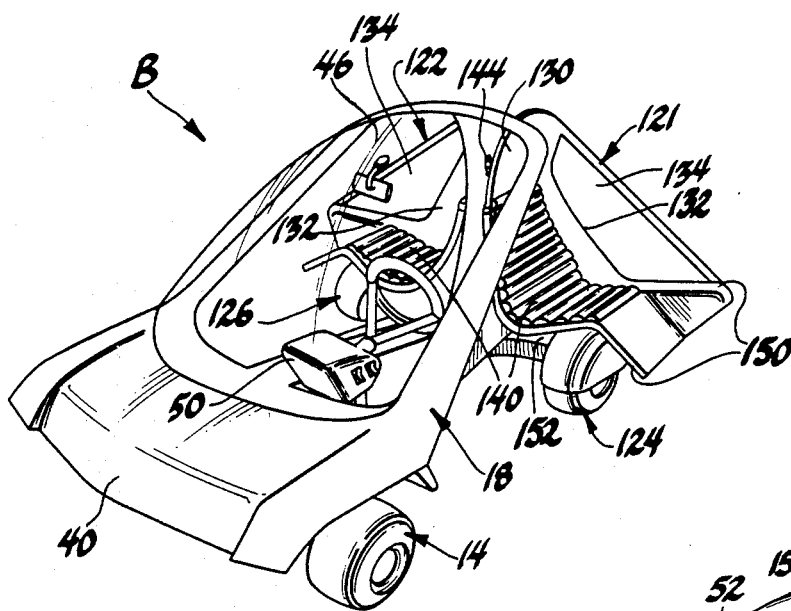
FIG. 7 is a front perspective view of a second embodiment of a small, lightweight vehicle in accordance with the present invention and having a two seat rear module and illustrating the same in their open positions.
Figure 8:
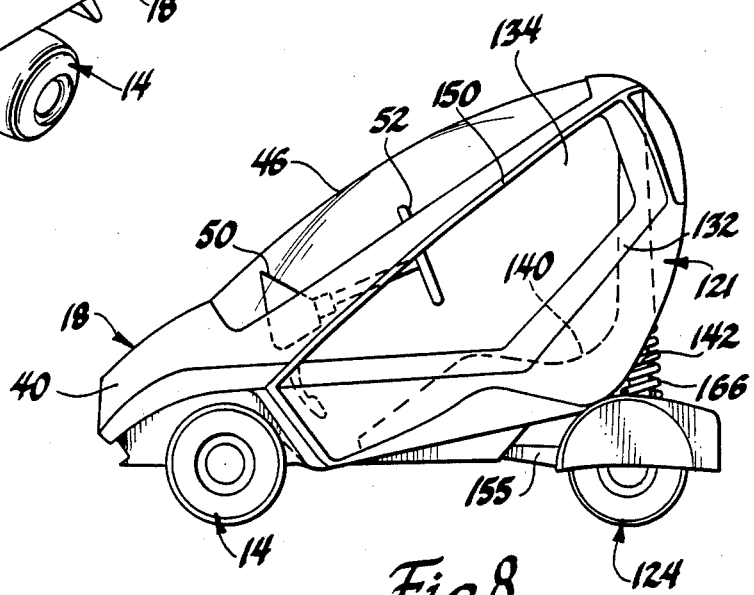
FIG. 8 is a side elevational view of the vehicle shown in FIG. 7, but with the rear seat modules in their closed position.
Figure 9:
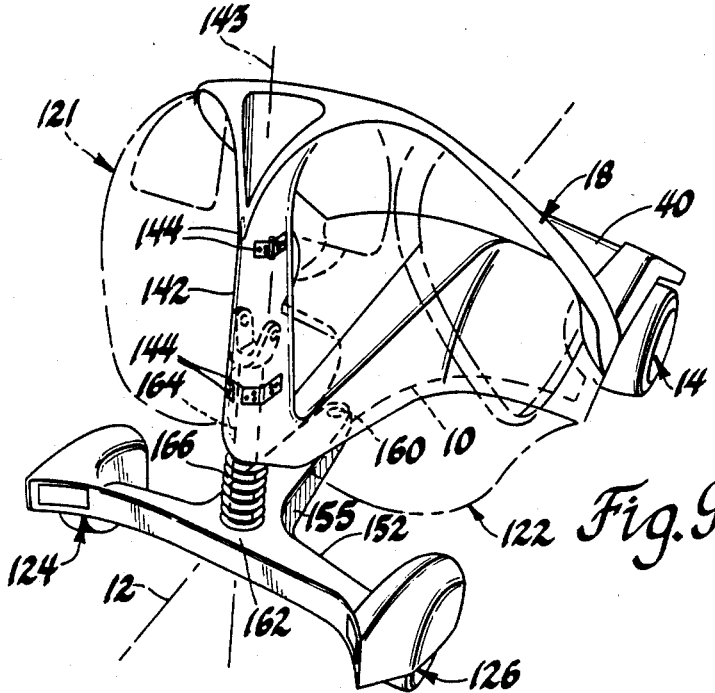
FIG. 9 is a rear perspective view of the vehicle shown in FIG. 7, but with the rear seat modules only illustrated in phantom outline.

Referring to the drawings, FIGS. 1-6 show a first embodiment of a small, automotive vehicle A of the present invention in which the vehicle A is designed for use as a one seater for a single occupant or driver. FIGS. 7-9 show a second embodiment of a vehicle B of the present invention in which the vehicle is designed for use as a two seater, a driver and a passenger.

Figure 1:
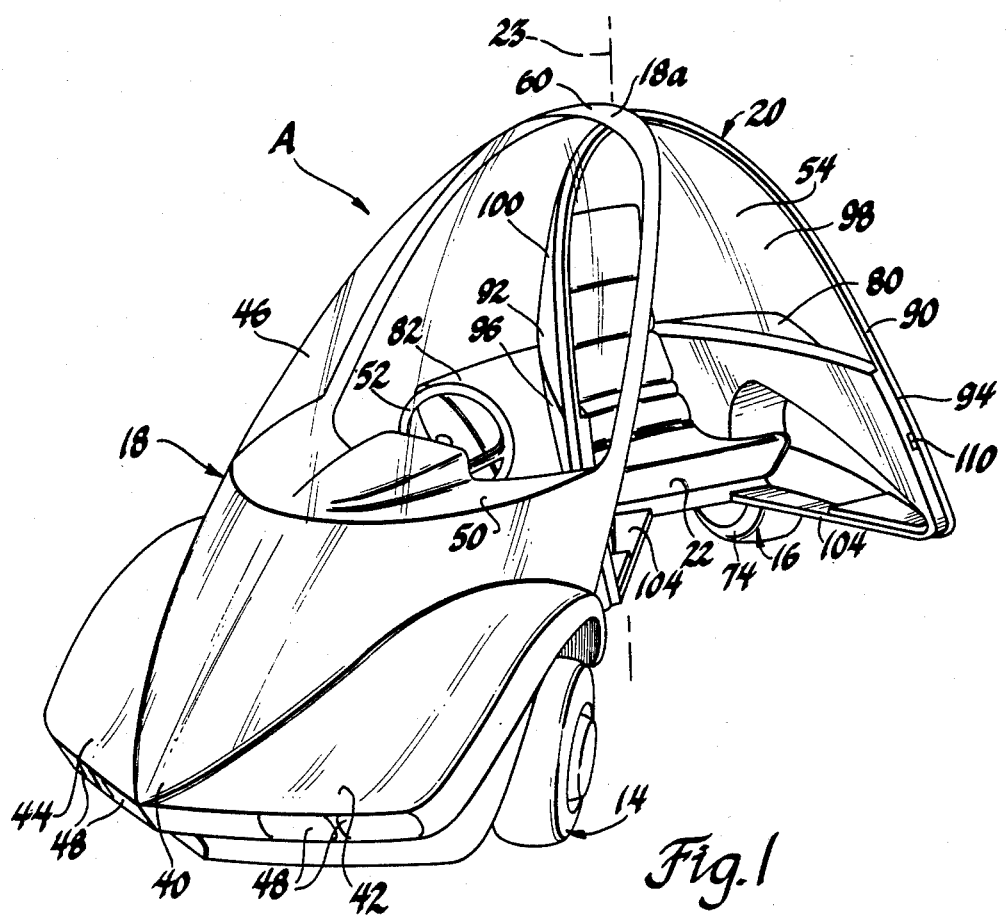
FIG. 1 is a front perspective view of a first embodiment of a small, lightweight vehicle in accordance with the present invention and which has a one seat rear module and illustrating the same in its open position.
Figure 2:
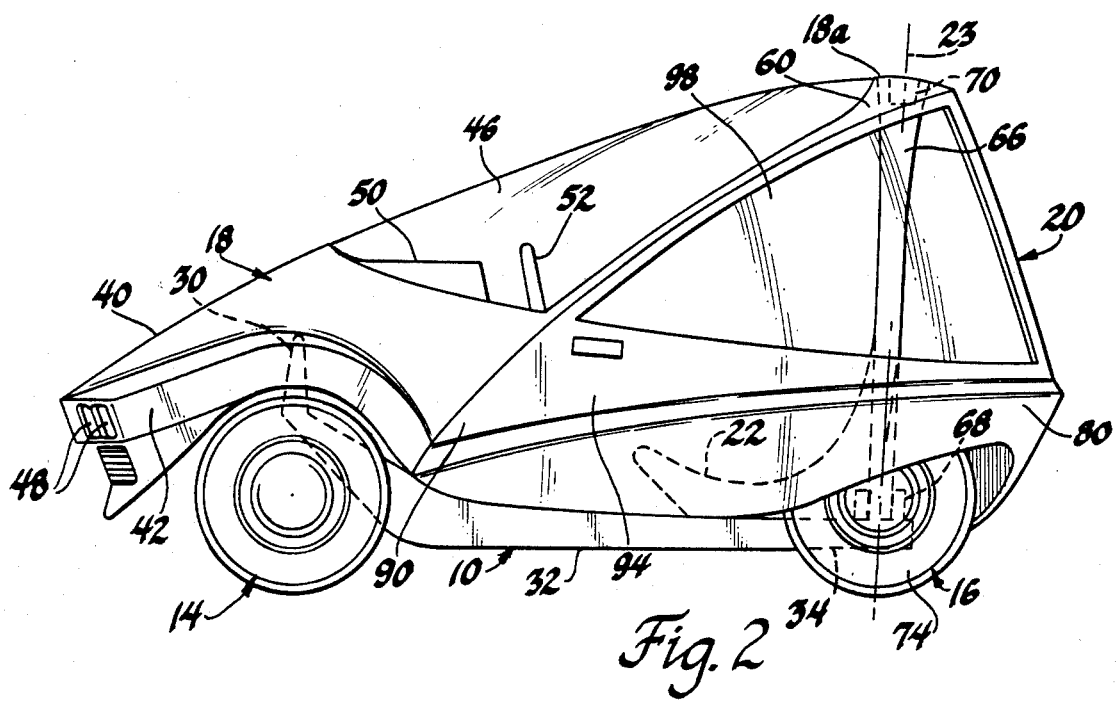
FIG. 2 is a side elevational view of the automotive vehicle shown in FIG. 1.
Figure 3:
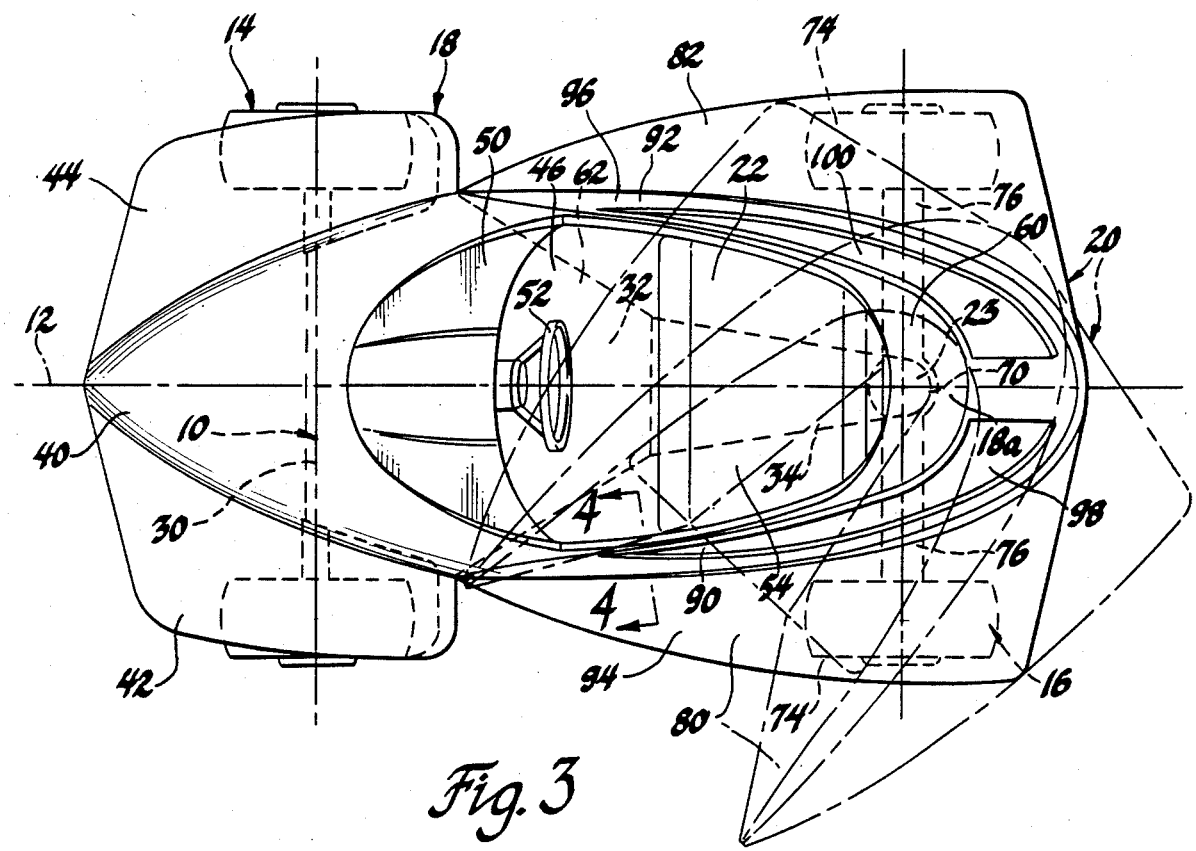
FIG. 3 is a top plan view of the automotive vehicle shown in FIGS. 1 and 2 and which illustrates in the solid line position the rear seating module in its closed position and in its phantom line position the rear seating module in its open position.

The vehicle A of the first embodiment of the present invention, comprises, in general, a unitary frame or frame means 10 having a longitudinal axis 12, front and rear wheel assemblies 14 and 16, respectively, a front body unit or module 18 stationarily mounted to the frame means 10, a rear body unit or module 20 containing a vehicle body seat or seat means 22 and which is pivotally supported by the frame means 10 and the front module 18 adjacent its rear end 18a for movement about a generally vertical axis 23 which intersects the longitudinal axis 12 of the frame means 10 to permit the rear module 20 to be moved between an open position, as shown in FIG. 1, to permit entry and exit of the driver and a closed position, as shown in FIG. 2 or by the solid line position of FIG. 3, in which the rear seating module 20 is lockable to the front module 18 and the vehicle A can be operated, and an inflatable seal means 24 to permit the rear seating module 20 to be sealed and unsealed from the front module 18.

The frame means 10 for supporting the vehicle A can be of any suitable conventional construction, but preferably is of a unitary construction and is shown in the drawings as comprising a front portion 30 to which the front wheel assemblies 14 are mounted via suitable or conventional suspension means (not shown), a midportion 32 and a rearward portion 34. The forward portion 30 of the frame means 10 also suitably supports the front body module 18 and rearward portion 34 pivotally supports the rear seating module 20.

The front body module 18 has a generally rearwardly sloping exterior body configuration and includes a front or hood portion 40 left and right fender 42 and 44 and an elongated curved rearwardly sloping windshield 46. The hood 40 and fenders 42 and 44 together with the remaining body structure define a front compartment for containing an engine, front wheel drive means, a fire wall and other usual or conventional vehicle components usually found in the front or engine compartment of a vehicle. The front module 18 also includes front body structure for defining openings for headlights 48 and for supporting the windshield 46. The front module 18 also includes a vehicle dashboard 50 extending laterally of the vehicle adjacent the lower end of the windshield 46 to which the various vehicle controls, ventilating and heating ducts, etc., are mounted. The front module 18 also includes a steering wheel 52 extending into an interior passenger compartment 54 defined by the front and rear modules 18 and 20, respectively. The front module 18 also supports a suitable steering mechanism operatively connected with the front wheel drive assemblies 14 of the vehicle A.

The front module 18 further includes a rearwardly extending arcuate support structure 60 surrounding the windshield 46 and includes a vehicle floor means 62 which is also connected to the midportion 32 of the frame means 10.

The rear seating module 20 preferably comprises a preassembled unitary module having a vertically extending support strut 66 which is suitably pivotally supported adjacent its lower end via a pivot and bearing means 68 by the rearward portion 34 of the frame means 10 and at its upper end pivotally mounted via a suitable pivot or bearing means 70 to the front body support structure 60 at the rearward end 18a of the forward module 18. Rather than a single strut means 66, as shown in FIG. 2 being employed, it should be understood that separate pivot or bearing support arrangements carried by the upper end of the support structure 60 of the front module 18 and the rearward portion 34 of the frame means 10 could be employed. The rearward rear module 20 also includes suitable support structure connected to the strut means 66 for supporting the rear wheel or wheel assemblies 16, each of which includes a wheel 74 and an axle 76. The wheel assemblies 16 are suitably connected via the support structure to the support strut means 66 so as to be rotatable in unison with the rear module 20.

The rear seat module 20 also includes suitable exterior body structure which define fenders, 80 and 82 which cover the upper ends of the left and right wheel assemblies 16, respectively, and includes body structure defining side closures 90 and 92, The side closures 90 and 92 are of a curved construction to define a pair of side doors 94 and 96 carrying windows 98 and 100. The side closures 90 and 92 at their rear define a back support therebetween for supporting the seat means 22. The seat means 22 could be of any suitable or conventional construction as hereshown as a curved, single occupant seat supported by the rear module 20 between the side closures 90 and 92 adjacent their contiguous rearward ends. As best shown in FIG. 1, the side closures 90 and 92 adjacent their lower ends have generally horizontally disposed portions 104 which function as a step and provide foot rests.

In operation and with the rear seat module 20 in its open position, as shown in FIG. 1, the operator of the vehicle can back into the seat means 22 and sit down. He can then with his foot push off the ground or grab a handle (not shown) attached to the inner side of the support structure 60 of the front module 18 and pivot or swing the rear module 20 about the pivot axis 23 from its open position, as shown in FIG. 1, or the phantom line position as shown in FIG. 3, to its closed position, as shown by the solid lines in FIG. 3. It should be noted that the rear wheel assemblies 14 and 16 are pivotally mounted with the remaining body structure of the rear module 20 so as to be rotatable therewith. To allow this to happen, any brake system (not shown) carried by the rear module 20 and used in conjunction with the rear wheel assemblies 16 can be suitably deactivated by means (not shown) responsive to the action of opening the door prior to pivotally moving the rear module 20. The vehicle A will remain stationary during this closure movement due to the fact that the front brakes or parking brake (not shown) applied to the front wheel assemblies 14 prevents any movement of the vehicle A. When the operator has moved the rear module to its solid line position, as shown in FIG. 3, in which it is longitudinally aligned with the longitudinal axis 12 of the vehicle, he can lock the rear module 20 in place on the vehicle A via a suitable or conventional locking mechanism controlled by a control means (not shown) on the dashboard. To this end, the front side of the closure means 92 can be provided with suitable locking receptacles or catches 110 to which a suitable latch bolt carried by the front module 18 and activated by a control rod 20 (not shown) can be used to latch the rear module 20 in place on the vehicle A. The brake system or systems employed could be of any suitable or conventional construction and could be either manually or power operated.

Figure 4:
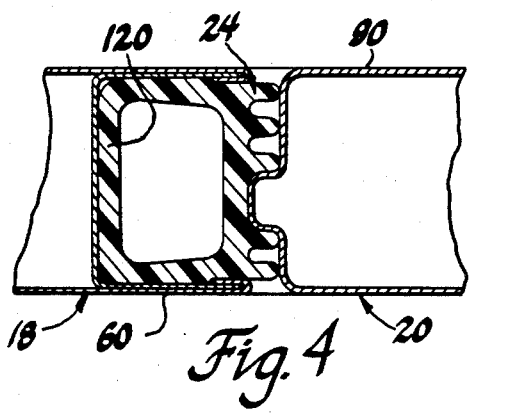
FIG. 4 is an enlarged fragmentary sectional view taken approximately along the 4—4 of FIG. 3.
Figure 5:
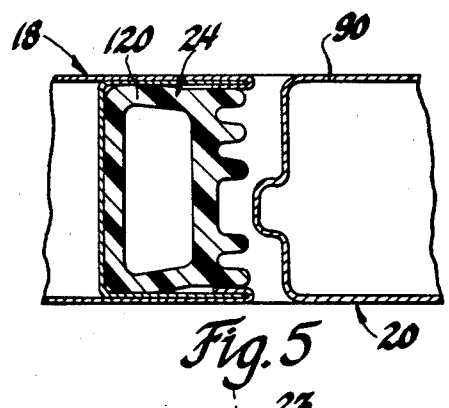
FIG. 5 is a fragmentary sectional view like that shown in FIG. 4, but showing different parts thereof in different positions.

It is contemplated in accordance with the provisions of the present invention, that a suitable or convention seal means 24 be employed to the seal the rear body module 20 along the front edges of the closure means 90 and 92 to the front module 18 when the rear module is in its closed position. To this end, a suitable inflatable seal means 24, such as used in the aircraft industry, can be employed. For example, as shown in FIG. 4, a suitable elongated hollow inflatable seal 120 made of a suitable elastomeric material can be employed and carried between the inner and outer walls of the support structure 60 of the front module 18 and along the sides of its floor 62. By using a suitable compressed air source, the seal 120 can be moved from its deflated position, as shown in FIG. 5, in which it is not sealed against the rear module 20 to a sealed position, as shown in FIG. 4, in which compressed air has been supplied to the seal 120 to expand the same and to engage the rear module 20 to provide a seal around the closure means 90 and 92 and along the bottom or floor thereof. A control for causing inflation or deflation of the inflatable seal 120 can be suitably provided for on the dashboard of the vehicle and which is readily accessible to the operator or could be automatically activated by the door locking mechanism when the latter is actuated to lock the rear module 20 in place on the vehicle A. It should also be understood that the inflatable seal could be carried by the rear module, if desired, or that a conventional deflectable elastomeric seal means could be employed either alone or in conjunction with an inflatable seal means.

When operation of the vehicle is no longer desired, and the vehicle is stopped, the front brakes can be locked, the seal means deflated from its position, as shown in FIG. 4, to its position, as shown in FIG. 5, and the locking means unlatched. The operator can then, by pushing off from the side of the interior of the front module 18, move the rear module 20 about the pivot axis 23 from its closed position, as shown by the solid lines in FIG. 3, to its open position, as shown by the phantom lines in FIG. 3, or as shown in FIG. 1. It should be noted that a suitable power operated means could be provided to unlatch the rear module 20 from the front module 18 and/or rotate the rear module 20 from its closed position to its open position and vice versa, if desired.

Figure 6:
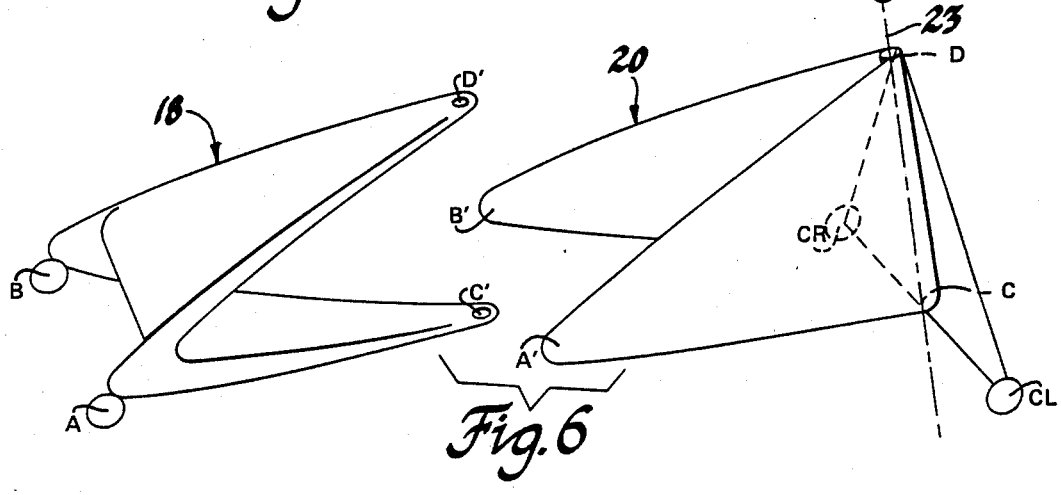
FIG. 6 is a schematic illustration of the basic tetrahedron body shell shape which is incorporated in the vehicle shown in FIG. 1.

As best shown in FIG. 6, the basic structural shell of the vehicle A is that of a tetrahedron, that is, the front module 18 and frame means 10, along with the rear module 20 basically comprises a tetrahedron laid flat on one of its four sides. It rests on four points, schematically designated by the letters A, B CR, CL, these points corresponding to the front and rear wheels of the front and rear wheel assemblies 14 and 16. The pivot axis 23 of the rear module 20 is designated by the line DC which defines the rear edge of the module 20. The foremost points of the side closures 90, 92 of the rear module 20 are represented by the points A', B'. The distances CCR and CCL define extensions of point C overhung from the edge DC. If the extreme upper and lower ends of the line DC are made into pivots with a vertical axis 23 running through both points C and D, then it becomes possible to swing the pair of sides defined by B'CD and A'CD (which correspond to the sides of the rear module 20) relative to the open sides BC'D' and AC'D' (which correspond to the front and upper and lower rear end points of the front module 18).

FIGS. 7-9 show a second embodiment of a small lightweight vehicle B of the present invention in which the vehicle B is designed as a two seater for both a driver and a passenger. The parts of the vehicle B which are similar or correspond to the parts of the vehicle A previously described will be given the same reference numerals.

The vehicle B differs from the previously described vehicle A in that it includes a pair of rear seating units or modules 120, 122 and has its left and right rear wheel assemblies 124, 126 as viewed in FIG. 9, supported by the frame means 10 and the front module 18 for independent up and down movement relative to the rear seat modules 120, 122. The seating modules 120 and 122 each comprise a back support 130 and an outer side closure 132 with a window 134, and are open on the other side and front. The back support 130 is shaped to the contour of a seat and supports a suitable seat means 140. The seating modules 120, 122 are pivotally connected to an upwardly extending tubular shaped strut 142 via a suitable or conventional pivot means 144 for pivotal movement about or closely parallel to the axis 143 of the strut 142. The strut 142 forms an acute included angle with the frame means 10 and forms part of the front module 18.

The seating modules 120, 122 are rotatable about the axis 143 of the strut 142 between and open position, as shown in FIG. 7 in which it is disposed substantially perpendicular to the longitudinal axes 12 of the vehicle B to permit entry into and exit from the vehicle B, and a closed position, as shown in FIG. 8, in which it is longitudinally aligned with the vehicle or vehicle axis 12. The seating modules 120, 122 are movable between their positions in the same manner that the seating modules 20 of the previously described vehicle A is movable between its positions.

When the seating modules 120, 122 are in their closed position, the open sides thereof are closely adjacent each other and the entire periphery 150 of the seating module 120, 122 sealing engage against a seal means (not shown) located contiguously thereto and carried by the front module 18 including the strut 142. A suitable or convention locking means (not shown) is provided to lock the seating modules 120, 122 to the front module 18 when in their closed position.

The left and right wheel assemblies 124, 126, which include wheels and axles, are suitably supported by a generally T-shaped frame member 152 whose forward leg 155 is swivelly connected to the frame means 10 via a swivel means 160 and which is swivelly connected at the midportion of the Tee 162 to the rear strut 142 of the front module 18 via a suitable suspension means 164 including a coil spring 166. The rear wheel assemblies 124, 126 are thus supported for movement up and down in the plane of an perpendicular to the longitudinal axis 12 of the vehicle B relative to the front module 18.

From the foregoing, it should be apparent that the present invention provides novel, small, lightweight vehicles which can readily be entered and exited from and which require only a minimal amount of side clearance to permit entry and exit therefrom.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. An automotive vehicle comprising a body having a horizontal support frame termianting in a rear end and an upwardly and rearwardly extending support structure which terminates in an upper end disposed above said rear end of said horizontal frame, said body forming a front compartment for containing an engine, drive train means, windshield, dashboard and steering means,
   a rear body module means having body structure including side closure means and back support pivotally connected to said rear end of said frame and upper end of said support structure by a pivot means for movement about an upright generally central vehicle pivot axis,
   said rear body module means including a seat secured to the back support, window means carried by the side closure means, and a front opening periphery, said rear body module means being rotatable about said pivot axis between a closed position in which said rear body module means is longitudinally aligned with said front compartment of said body and an open position in which said rear body module means has its front opening periphery disposed laterally of said vehicle so as to permit ingress and egress to said vehicle,
   means for locking said rear body module means to said body when in its closed position and to unlock the same to enable the rear body module means to be moved to its open position,
   and seal means carried by said body and rear body module means for providing a seal between said body and rear body module means when the latter is in its closed position.

2. An automotive vehicle comprising a body having a horizontal support frame having a longitudinal axis and terminating in a rear end and an upwardly extending support structure which terminates in an upper end disposed above said rear end of said horizontal frame, said body forming a front compartment for containing an engine, front wheel drive means, windshield, dashboard and steering means,
   a single rear body module pivotally connected to said rear end of said frame and said upper end of said support structure by a pivot means for movement about a generally vertical pivot axis which intersects said longitudinal axis,
   said rear body module having a longitudinal axis and including body structure defining a back support and horizontal portions, a seat secured to the back support and horizontal portions, side closure means secured to the horizontal portions and a front opening, windows carried by the side closure means, and rear wheels, said rear body module being rotatable about said pivot axis between a closed position in which said rear body module is longitudinally aligned with said longitudinal axis of said vehicle, and an open position in which said rear body module has its longitudina axis skewed with respect to the longitudinal axis of said vehicle to expose said front opening to permit ingress and egress to said vehicle,
   means for locking said rear body module to said body when in said closed position and to unlock the same to enable the rear body module to be moved to its open position,
   and inflatable seal means carried by one of said closure means of said rear body module and said body for providing a seal between said body and rear body module when in said closed position.

3. In an automotive vehicle, as defined in claim 2, and wherein said body and rear module together define an overall body shell having a geometric shape in the form of tetrahedron.

4. In an automotive vehicle, as defined in claim 3, and wherein said tetrahedron shape has four longitudinally extending sides and with the frame and upwardly extending support structure of said body comprising two stationary sides terminating respectively in vertically spaced points and with the rear body module comprising a pair of generally vertically extending, intersecting sides having intersecting ends pivotally connected to said points for movement about said pivot axis whereby said sides of said rear body module are rotatable relative to said two stationary sides of said body.

5. In an automotive vehicle, as defined in claim 1, and wherein said horizontal support frame and said upwardly extending support structure form an acute included angle therebetween and wherein said rear body module means comprises a pair of side-by-side modules pivotally connected to said body for movement independently of each other and whose adjacent sides are open, said seats of said modules being located side-by-side when the modules are in their closed position.

* * * * *